United States Patent Office 3,326,929
Patented June 20, 1967

3,326,929
PROCESS FOR THE PURIFICATION OF
Δ²-OXAZOLINES
Wolfgang Seeliger, Marl, Germany, assignor to Chemische Werke Hüls Aktiengesellschaft, Marl, Germany
No Drawing. Filed Dec. 15, 1964, Ser. No. 418,542
Claims priority, application Germany, Mar. 18, 1964, C 32,442
6 Claims. (Cl. 260—307)

The present invention relates to the purification of Δ²-oxazolines. More particularly, it relates to the purification of Δ²-oxazolines by treatment with acid chlorides or anhydrides.

The production of Δ²-oxazolines is accompanied by the formation of certain by-products which for certain types of uses must be completely separated from the Δ²-oxazoline. In the past, the purification of Δ²-oxazoline has usually been accomplished by distillation or crystallization. However, even after such purification by processes which normally give satisfactory purification, the Δ²-oxazoline remains contaminated with small amounts of such compounds as amines and hydroxyl compounds which cause undesirable results when the Δ²-oxazolines are used for certain purposes. For example, during the polymerization of Δ²-oxazolines with cation-active catalysts, even small amounts of such contaminants can cause chain breakage so that only medium length polymerization products will be produced unless high concentrations of catalyst are used. In order to avoid the necessity of this increased cost, therefore, it is desirable to use a Δ²-oxazoline which is free from such contaminants. Other reactions and uses also make it desirable to have available a pure form of Δ²-oxazolines which have not been available from previously known conventional methods for the purification of Δ²-oxazolines.

It has previously been known that Δ²-oxazolines can be purified by distillation over metallic sodium. The use of such a process on an industrial scale, however, presents important disadvantages because of the hazards incident to the handling of metallic sodium. It has also previously been known that amines and hydroxyl compounds such as water or alcohols would react with acid chlorides or acid anhydrides. However, the discovery that acid chlorides or acid anhydrides could be used to remove the amine and hydroxyl impurities associated with Δ²-oxazolines was wholly unexpected since it was known that acid chlorides and acid anhydrides react with Δ²-oxazolines to split open the rings. Hence, it was entirely unexpected that attempts to purify technically pure Δ²-oxazolines with the aid of small amounts of acid chlorides or acid anhydrides would result in the production in very pure grades of Δ²-oxazolines.

It has now been discovered that by treating Δ²-oxazolines with 0.05 to 15% by weight of acid chlorides or acid anhydrides, the Δ²-oxazoline can be satisfactorily purified so that polymerization can be effected by cation-active catalysts without chain breakage.

A particularly satisfactory method of carrying out the purification operation comprises distilling together the Δ²-oxazoline and acid chloride or acid anhydride, the distillation being preferably effected under reduced pressure.

The chemical structure of the Δ²-oxazoline can be expressed by the following structural formula:

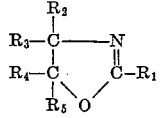

in which $R_1$, $R_2$, $R_3$, $R_4$ and $R_5$ can be, aliphatic, cycloaliphatic, aromatic, or heterocyclic radicals. Preferably, however, Δ²-oxazolines are used in which at least two of the said groups are hydrogen atoms. Examples of Δ²-oxazolines of the above formula include: 2-methyl- and 2-propyl-, which are 2-lower-alkyl-Δ²-oxazolines, 2-phenyl-, which is a 2-monocyclic hydrocarbon aryl-Δ²-oxazoline, or 2-toluyl-Δ²-oxazoline which is a 2-lower-alkyl-monocyclic hydrocarbon aryl-lower-alkanoyl-Δ²-oxazoline, and 2,4-dimethyl-Δ²-oxazoline, which is a 2,4-dilower-alkyl-Δ²-oxazoline, etc.

Examples of acid chlorides which can be used for the purification of the Δ²-oxazolines include: phosgene, acetyl chloride, propionyl chloride, butyryl chloride, benzoyl chloride, toluyl chloride, thionyl chloride, chloroformic ethyl ester, and other homologous compounds. Suitable acid anhydrides include: acetic anhydride, propionic anhydride, butyric anhydride, phthalic anhydride, succinic anhydride, glutaric anhyride, and the like.

The amount of acid chloride or anhydride to be used in the process of the present invention depends on the degree of purity of the Δ²-oxazoline, the greater amount of contaminants present with the Δ²-oxazoline the more acid chloride or anhydride generally required for the purification. Generally, from 0.05 to 15% by weight, and usually from 0.1 to 10% by weight of the acid chloride or anhydride, based on the weight of the Δ²-oxazoline, is sufficient for adequate purification.

The purification can be effected at room temperature, but preferably at temperatures ranging from 30 to 200° C. Temperatures below 200° C. and reduced pressures are generally preferred.

The purification operation can be carried out in any convenient manner but it is generally found most convenient to effect the purification by distilling the technically pure Δ²-oxazoline with the acid chloride or anhydride whereby the pure Δ²-oxazoline is simultaneously separated from the amide or ester formed during the purification operation. The separation of the pure Δ²-oxazoline from the resulting amide or ester can also be accomplished by crystallization but when this is done the use of hydroxyl-containing solvents should be avoided. Suitable solvents for use for crystallization include: substantially water-free petroleum ether, benzene, toluene, xylene, or ether.

The Δ²-oxazolines purified in accordance with the present invention can readily be polymerized to high molecular weight polymers and at the same time reduced amounts of cation-active catalysts are required for the operation, as compared to the use of Δ²-oxazolines not so purified.

The examples which follow will illustrate the method of purifying Δ²-oxazolines by the method of the present invention. Variations of the procedures shown therein will be obvious to one skilled in the art and it is understood that such variations which do not depart from the concept of the disclosures set out herein are intended to come within the scope of the appended claims.

*Example I*

80 parts by weight of technically pure 2-phenyl-Δ²-oxazoline, prepared by the method described in Ber. der dtsch. chem. Ges. 23 (1890) 2495, which after distillation through a column boils at 68–69° C. at 0.2 torr, were distilled with two parts by weight of benzoyl chloride. At 69° C. and 0.2 torr pressure, 76.2 parts by weight of pure 2-phenyl-Δ²-oxazoline passed over.

For purposes of comparison, in each of 20 parts by weight of technically pure and purified 2-phenyl-Δ²-oxazolines, prepared as above described, 0.017 part by weight of 2-phenyl-Δ²-oxazoline p-toluene-sulfonate was dissolved. Each sample was then placed in a closed vessel under dry nitrogen gas and both heated for 4.5 hours at 130° C. and then for 14 hours at 140° C. (bath temperatures). Upon examination of the two samples at the end of this period it was found that the technically pure 2- phenyl-$\Delta^2$-oxazoline had not been preceptably polymerized whereas the purified sample of the same compound had been converted into a high molecular weight hard polymer. By increasing the concentration of the catalyst to 0.5 part by weight, a polymerization product was also obtained from the technically pure sample of the 2-phenyl-$\Delta^2$-oxazoline, although of lower molecular weight than that of the purified sample polymerized with the lower amount of catalyst.

The 2-phenyl-$\Delta^2$-oxazoline p-toluene-sulfonate used as the catalyst was prepared from a mixture of 2.9 parts by weight of 2-phenyl-$\Delta^2$-oxazoline and 3.8 parts by weight of p-toluene-sulfonic acid hydrate in ethanol by precipitation with ether. The resulting product was dried in a vacuum dessicator over concentrated sulfuric acid. Yield: 5.2 parts by weight. Melting point: 123–127° C. Composition:

Experimental: C, 60.1%; H, 5.5%; O, 20.3%; N, 4.1%; S, 9.6%. Theoretical: C, 60.2%; H, 5.3%; O, 20.1%; N, 4.4%; S, 10.1%.

*Example II*

In this experiment, 40 parts by weight of technically pure 2-propyl-$\Delta^2$-oxazoline were reacted with 1 part of pure acetic anhydride at 20° C. and then distilled under 140 mm. Hg pressure.

By polymerization at 120 or 125° C., using from 0.01 to 0.04 molar percent of a cation-active catalyst such as, for example, boron trifluoride etherate, iodine, p-toluenesulfonic acid or ethyl iodide, a high molecular weight solid plastic was obtained only when using the purified 2-propyl-$\Delta^2$-oxazoline. By increasing the amount of the catalyst to above 0.1 molar percent it was possible to produce polymerization products from the unpurified sample also but only of lower molecular weight.

*Example III*

100 parts by weight of technically pure 2-methyl-$\Delta^2$-oxazoline with a water content of 1% by weight were mixed with about 5 parts by weight of acetyl chloride at 20° C. and then distilled with the exclusion of atmospheric moisture. At temperatures ranging from 108 to 110° C. 89.7 parts by weight of pure, water-free 2-methyl-$\Delta^2$-oxazoline passed over, $n_{20}^D = 1.4334$. Composition:

Experimental: C, 56.4%; H, 8.4%; N, 16.3%; O, 18.9%. Theoretical: C, 56.5%; H, 8.2%; N, 16.5%; O, 18.8%.

By polymerization of technically pure and purified samples, the same differences were noted as in Examples I and II.

*Example IV*

100 parts by weight of crude 2-methyl-$\Delta^2$-oxazoline were dried with powdered caustic potash, the upper layer separated and left standing overnight with fresh caustic potash powder. The material was then filtered and distilled, as in Example III, with 10 parts by weight of acetyl chloride. The distillate, on the basis of its boiling point (107–109° C.), UR spectrum, index of refraction ($n_{20}^D = 1.4317$), and its ability to undergo polymerization, was pure 2-methyl-$\Delta^2$-oxazoline.

What is claimed is:

1. The process of purifying $\Delta^2$-oxazolines having the structural formula

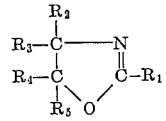

in which $R_1$ is selected from the group consisting of aliphatic, cycloaliphatic, or aromatic, radicals, and $R_2$ to $R_5$ is selected from the group consisting of hydrogen and aliphatic with the provision that at least 2 of $R_2$ to $R_5$ represent hydrogen, which comprises treating said $\Delta^2$-oxazoline with 0.05 to 15% by weight of a material selected from the group consisting of acid chlorides and acid anhydrides, and separating resultant purified oxazolines from the reaction mass.

2. A process as defined by claim 1 wherein said $\Delta^2$-oxazoline is selected from the group consisting of 2-lower-alkyl-$\Delta^2$-oxazoline, 2-monocyclic hydrocarbon aryl-$\Delta^2$-oxazoline, 2-lower-alkyl-monocyclic hydrocarbon aryl-lower-alkanoyl-$\Delta^2$-oxazoline, and 2,4-dilower-alkyl-$\Delta^2$-oxazoline.

3. A process as defined by claim 1 wherein said $\Delta^2$-oxazoline is selected from the group consisting of 2-methyl-, 2-propyl-, 2-phenyl-, 2-toluyl-, and 2,4-dimethyl-$\Delta^2$-oxazolines.

4. A process as defined by claim 1 wherein the purifying and separating steps are conducted by distilling the pure $\Delta^2$-oxazoline with said material whereby the pure $\Delta^2$-oxazoline is simultaneously separated from amide or ester formed during the purification operation.

5. A process as defined by claim 2 wherein the purifying and separating steps are conducted by distilling the pure $\Delta^2$-oxazoline with said material whereby the pure $\Delta^2$-oxazoline is simultaneously separated from amide or ester formed during the purification operation.

6. A process as defined by claim 3 wherein the purifying and separating steps are conducted by distilling the pure $\Delta^2$-oxazoline with said material whereby the pure $\Delta^2$-oxazoline is simultaneously separated from amide or ester formed during the purification operation.

References Cited

Gabriel et al., Berichte der Deutschen Chemischen Gesellschaft, vol. 23 (1890), p. 2502.

Leffler et al., J. Am. Chem. Soc., vol. 59 (1937), pp. 2256–57.

Wiley et al., Chem. Reviews, vol. 44 (1949), pp. 450–53.

ALEX MAZEL, *Primary Examiner.*

HENRY R. JILES, *Examiner.*

RICHARD J. GALLAGHER, *Assistant Examiner.*